INVENTORS
PHILIP S. FAY
ROBERT A. RIGHTMIRE

July 5, 1966 P. S. FAY ETAL 3,259,524
ELECTROCHEMICAL REACTION APPARATUS
Filed March 2, 1961 3 Sheets-Sheet 2

INVENTORS.
PHILIP S. FAY
BY ROBERT A. RIGHTMIRE
Schramm, Kramer & Sturges
ATTORNEYS.

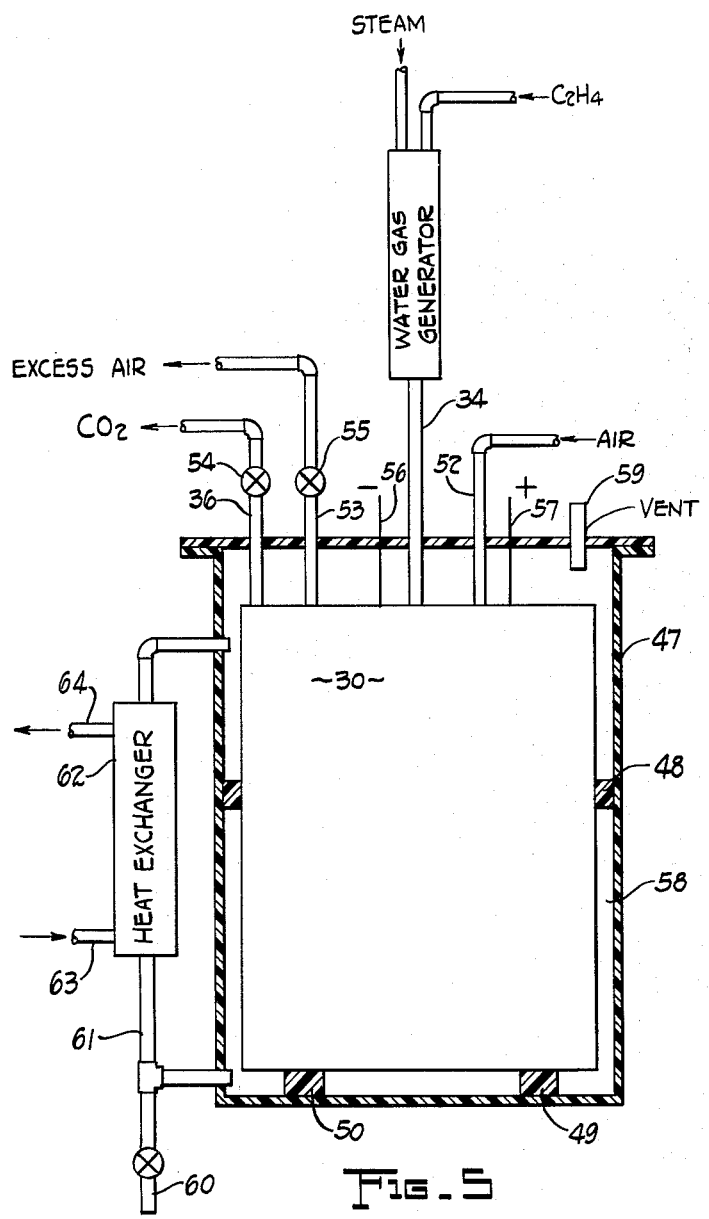

United States Patent Office 3,259,524
Patented July 5, 1966

3,259,524
ELECTROCHEMICAL REACTION APPARATUS
Philip S. Fay, Cleveland, and Robert A. Rightmire, Twinsburg, Ohio, assignors to The Standard Oil Company, Cleveland, Ohio, a corporation of Ohio
Filed Mar. 2, 1961, Ser. No. 92,935
4 Claims. (Cl. 136—86)

This invention relates generally to apparatus for directly converting one form of energy to another and more particularly relates to improvements in the structure and assembly of component parts of such apparatus. The principles of the invention, for exemplary purposes, will be described in reference to a fuel cell for directly converting chemical energy into electrical energy, it being understood, however, that these principles are applicable to other types of electrochemical reaction apparatus as well.

The direct conversion of chemical energy into electrical energy is accomplished by causing chemical reactions to take place between reactive materials at the junctures between spaced electron conductors and an intermediate ion-containing and conducting medium to form a continuous energy exchange system. The reactive materials are separately supplied to each juncture so that the charge exchange of the reaction takes place ionically through the ion conductor forming an internal circuit and electronically through the electron conductor forming an external circuit. Thus, where the reactive materials are continuously supplied and an electrical load is coupled to the external circuit it is possible to electrochemically convert the energy of chemical reaction directly into electrical energy in the external circuit.

Where, for exemplary purposes, hydrogen is employed as one of the reactive materials and oxygen as the other, the oxidation and reduction of these materials at the corresponding junctures between the electronic and ionic conductors generates electrical energy in the external circuit and produces water as a product of the reaction. When each of the reactive materials is continuously supplied and consumed within such an apparatus, it may be likened, respectively, to a fuel, and to an antifuel, the former of which is selected to yield electrons in its chemical reaction and the latter of which is selected to accept electrons.

In any such apparatus, the fuel and the antfuel are usually supplied in a relatively stable condition and require some means for activating their conversion from such normally stable reactant state to their reaction product states. Such conversion of the fuel and antifuel is believed to take place by virtue of chemical adsorption to a chemisorbed state and desorption to their reaction product states at the corresponding junctures between the electron and ion conductors. However, such conversion is not normally nor practically self-motivating and is, therefore, preferably enhanced by the introduction of some means to promote adsorption at each juncture and some ionic means in the ion-conducting medium which will promote desorption at each juncture. The reaction products may be readily removed from the apparatus in any convenient manner and preferably as they are formed.

In accordance with the exemplary application of the principles of this invention to a fuel cell, the electron conductors therein will be identified as electrodes and more specifically as the anode and cathode, respectively, depending upon whether they are on the fuel or the antifuel side of the cell. The fuel may be any substance which is oxidizable relative to the antifuel which in turn will be identified as any substance which is reducible relative to the fuel; where oxidation and reduction, respectively, contemplate the release and acceptance of electrons.

Further in accordance with the exemplary application of the principles of this invention to a fuel cell, the medium which is capable of conducting an electrical charge associated with an atom or a group of atoms, i.e., ions, shall be referred to hereinafter as an ion-conducting medium. The ion-conducting medium serves principally to isolate the electronic conductors from each other in the internal circuit and as the transfer vehicle for the ionic-charge exchange. The junctures between the electrodes and the ion-conducting medium will be identified throughout as interfaces. The activating means for promoting the conversion of the fuel and the antifuel as hereinbefore noted from their reactant state through the chemisorbed state to the reaction product state will be more specifically identified in conjunction with their functional coaction in the cell as an adsorber and a desorber.

The overall fuel cell reaction is an electrochemical reaction the efficiency of which is limited in part by the structural configuration and manner of assembly of the operative cell components. Such limiting factors may also detract from the full utilization of the fuel cell in many applications where size and configuration are significant. These limitations are minimized in accordance with this invention by predetermined design and assembly in a manner which increases the overall reaction and thus the efficiency of conversion without materially increasing the size and volume of the cell.

Briefly stated, in accordance with this invention there is provided an electrochemical reaction apparatus including an enclosed housing. Within the housing are a pair of spaced electrodes each of which is permeable to the respective electrochemical reactant supplied thereto. These electrodes have a predetermined devious configuration adopted to provide maximum coacting continuous electrode surfaces within said housing. The space between the electrodes is adapted to receive an ion-containing and conducting medium so that the internal circuit between adjacent internal surfaces of the electrodes is completed. These surfaces of the electrodes are maintained isolated from each other, and means are provided for feeding the respective electrochemical reactants separately to each of these surfaces. Suitable means are provided in the housing for exhausting the products of reaction from the apparatus.

In the annexed drawings:

FIG. 5 shows schematically a system utilizing the apparatus of FIGS. 2–4.

Figure 1:
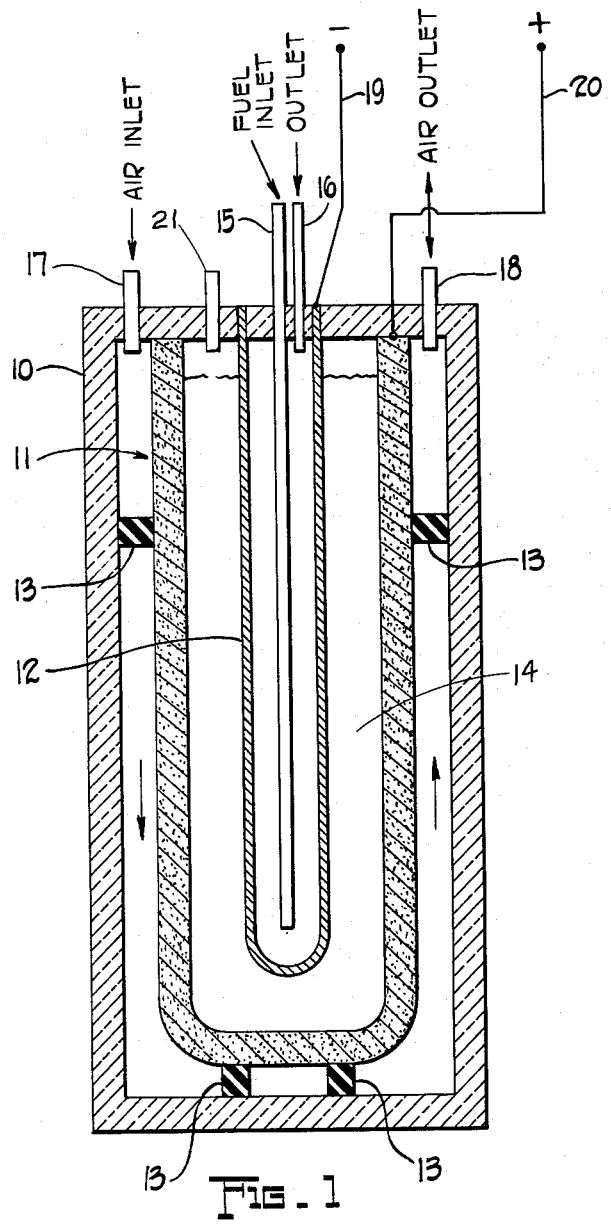
FIG. 1 is a diagrammatic and schematic illustration of a preferred embodiment of an electrochemical reaction apparatus employing the principles of this invention.

Referring now more particularly to FIG. 1, there is shown a fuel cell having an external housing 10 forming a cell body made of any suitable electrically non-conducting materials such as rubber, plastic or glass, which housing substantially encloses and surrounds a pair of tubular electrodes 11 and 12 that are concentrically disposed in spaced relation within the housing. The electrode 11 is preferably a porous graphite member having a suitable catalytic metal such as gold, platinum or palladium or the like deposited in the pores thereof and having its bottom extremity integrally closed to form a continuous electrode surface. The electrode 12 is preferably a thin-walled tubular member integrally closed at its bottom end and constructed of palladium for reasons to be hereinafter more fully described. Suitable spacer members 13 made of substantially chemically and electrically inert materials in relation to the components of the cell are used to support the electrode 11 in spaced relation within the housing 10. A tubular member 15 extends through the top wall of the housing into the tubular interior of the electrode 12 for the purpose of supplying fuel thereto. Tubular outlets 16 and 21 communicate through the top wall of the housing with the interior of the tubular electrode 12 and the space between the electrodes respectively to exhaust unreacted fuel and reaction by-products therefrom. Similar tubular members 17 and 18 communicate through the top wall of the housing 10 to supply the antifuel and to exhaust the products of reaction from the chamber formed thereby. While tubular electrodes are illustrated in the preferred embodiment of FIG. 1, it should be recognized that any predetermined devious electrode configuration, such as a sinuous or convoluted configuration, which will provide maximum coacting continuous electrode surfaces within an enclosed chamber may be employed.

While hydrogen alone or in admixture can be utilized as the fuel, we have found it preferable to utilize chemically-combined hydrogen in the form of a hydrocarbon such as ethylene or ethane as the fuel. Thus, we have found that the reaction of ethylene with water will proceed over a palladium foil as a catalyst at relatively low temperatures sufficient to produce enough hydrogen in the temperature range of 150° C. to 200° C. to saturate the palladium foil and provide for rapid diffusion therethrough. In the environment of a fuel cell as shown in FIG. 1, the reaction continues to completion with highly efficient oxidation of the hydrocarbon to carbon dioxide and water. Thus, for exemplary purposes, in the preferred embodiment shown in FIG. 1, ethylene and steam are passed through the inside of the palladium tubular electrode 12 while air is supplied to the inlets 17 and 18. Since the palladium is selectively permeable to hydrogen only, the carbon dioxide is readily flushed from the cell through the outlet 16. Thus, the palladium electrode 12 serves both as a dehydrogenation catalyst for the hydrocarbon fuel as well as a selective barrier against the by-products of the electrode reaction.

While any suitable ion-conducting medium 14 may be employed in the space between the concentrically disposed electrodes 11 and 12, in the preferred embodiment shown in FIG. 1 there is utilized an aqueous solution of potassium hydroxide. The potassium and hydroxyl ions of this solution coact with the diffusive properties of the palladium electrode 12 and with the metal deposits on the electrode 11 to activate and promote adsorption and desorption of the fuel and antifuel at the corresponding electrodes, respectively. A cell constructed in accordance with FIG. 1 can operate at a pressure of 75 to 150 p.s.i.g. and over a considerable range of temperature. The concentric disposition of the continuous tubular electrode surfaces provide increased electrical output per unit volume; the electrical output being taken from the cell by means of suitable leads 19 and 20 connected respectively to the electrodes 12 and 11.

Figure 2:
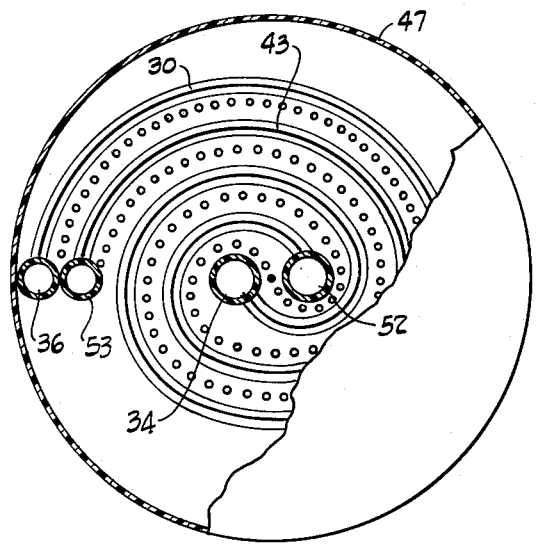
FIG. 2 is a diagrammatic cut-away top view of an other apparatus in accordance herewith.
Figure 3:
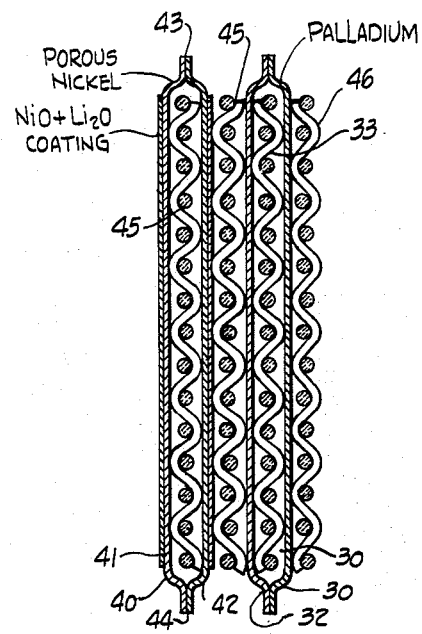
FIG. 3 is an enlarged cross-sectional view of the spiraliform electrodes shown in FIG. 2.
Figure 4:
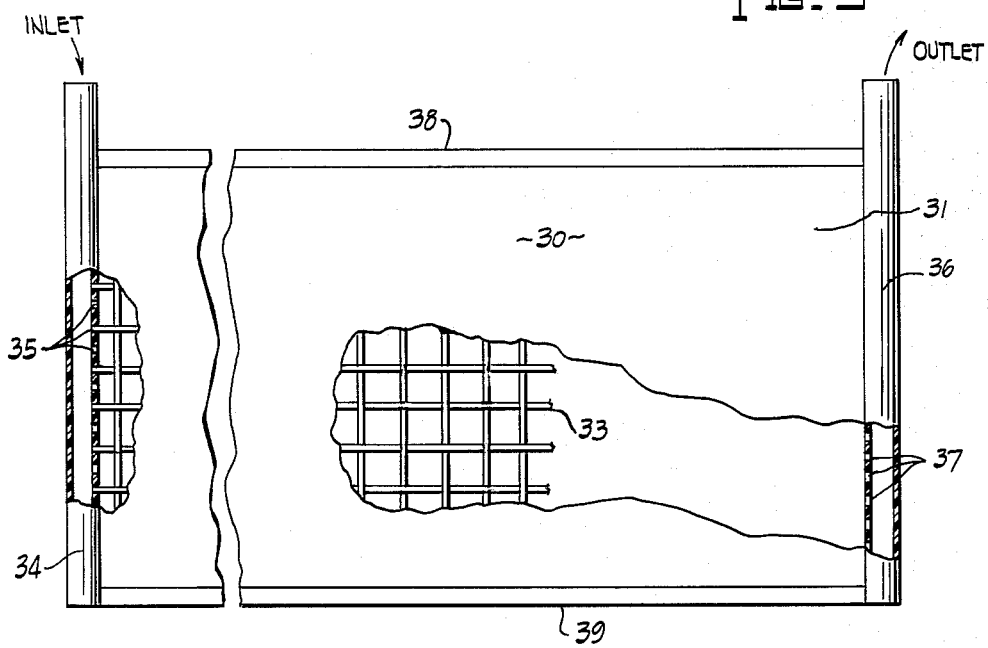
FIG. 4 shows a cut-away view of a single electrode member shown in FIGS. 2 and 3.

FIGS. 2, 3, 4 and 5 show another form of apparatus in accordance with the present invention. Another means for providing maximum coacting continuous electrode surfaces is to laminate a pair of electrodes with a separator sheet positioned therebetween to maintain them out of electrical contact with each other, and subsequently roll the laminar structure such that the respective electrode members assume a spiral condition such as shown in FIG. 2. In the specific embodiment shown in FIGS. 2–5, flexible electrode members are produced having a structure such as shown in FIGS. 3 and 4. FIG. 3 shows a cross-sectional view of laminated electrodes maintained separate by non-conducting separators, and much enlarged for better representation of the details. Electrode 30 is a composite structure made up of a pair of thin palladium sheets 31 and 32 secured together at the top and bottom. The interior walls thereof are maintained spaced apart by a non-conducting spacer 33, which may be fiber glass screen, for example. As indicated, above, palladium has the property of being permeable to hydrogen, and is therefore admirably adapted for use as an electrode material.

The elongated thin palladium sheets 31 and 32 are fitted with suitable inlet and outlet means, such as shown in FIG. 4. The electrode 30 is here shown in fragmentary cross-sectional view and inlet tube 34 is affixed to the end of the composite structure by any suitable means, and provided with any suitable means, such as perforations 35, for permitting entry of the contents of the inlet tube 34 to the interior of composite electrode 30. In like manner, an outlet tube 36 is affixed in any suitable way to the opposite end of the elongated composite electrode member 30, and is also provided with suitable outlet means, such as perforations 37, communicating with the interior of composite electrode 30 whereby the unused portion of the inlet gases may be exhausted from the system. Seams 38 and 39 serve to enclose electrode 30 and isolate electrochemical reactants contained internally thereof from the balance of the system.

Electrode 30 being made of palladium and permeable to hydrogen gas is able to isolate hydrogen in a selective manner from a mixture of gases. The antifuel electrode 40 is of similar construction to electrode 30 with the exception that instead of a thin continuous palladium foil, a thin porous nickel sheet having a thin coating of the oxides of nickel and lithium deposited on the surfaces thereof may be used for the antifuel electrode 40. This structure is permeable to gases and permits access of oxygen from air to the reactive interface between an ion-containing and conducting medium and the electrode. As in the case of fuel electrode 30, antifuel electrode 40 is a composite structure made up of two sheets 41 and 42 of porous nickel or perforated nickel foil welded together at the top and bottom, 43 and 44, respectively, and maintained separate by an internally disposed fiber glass screen spacer 45. The sheets of metal or porous metal desirably, although not necessarily, range in thickness from 0.001" to 0.01".

As previously indicated, a pair of electrodes having a structure such as shown in FIG. 4, but differing in composition or structure to account for differences in the fuel and antifuel as above explained, are placed in juxtaposed relationship and maintained separate by fiber glass screen spacer 45. In place of fiber glass screen spacer 45, any other inert, electrically non-conductive porous spacing member may be employed. Alternatively, spacer member 45 may be replaced with a resinous ion-containing and conducting medium such as an ion exchange resin. An auxiliary spacer member 46 is also provided so that when the laminated structure is coiled as shown in FIG. 2, the respective electrodes are maintained out of electrical contact with each other insofar as the internal circuit is concerned. The laminar assembly is then coiled substantially as shown in FIG. 2 and disposed within a container such as the container 47 shown in FIG. 2. The container 47 or its internal surface is conveniently made of an electrically non-conducting material such as glass, plastic, or rubber, and is inert to any ion-containing and conducting medium which may be used in the apparatus. In FIG. 5 there are shown spacer blocks, 48, 49, 50 and 51 which aid in positioning the coiled assembly within the container 47.

In the device as shown in FIG. 5, the composite electrode 30, or the fuel electrode 30 occupies the outermost position of the spiral. The inlet 34 is shown connected to a source of fuel which may be the product of reaction of ethylene with steam. Upon passage through a water gas generator there is obtained fuel hydrogen gas in admixture with carbon dioxide. As shown in FIG. 5, the physical mixture of gases is conducted to the inlet 34 of the electrode 30 and after following the devious contorted path of the electrode 30 finally emerges as a gas which has been depleted in respect of its hydrogen content. The extent of depletion will depend upon the rate at which the gas is forced through the electrode 30. Hydrogen will be removed from such physical admixture by diffusion through the palladium electrode wall for electrochemical reaction at the opposite surface thereof in the presence of an ion-containing and conducting medium, such as described above. The antifuel electrode 43 is interiorly spirally wound and hence not visible in FIG. 5. It is, however, provided with inlet 52 and outlet 53 and is adapted to receive air or other suitable antifuel from a source thereof, and to exhaust from the interior of the electrode 43 excess unused air, or the oxygen depleted by-product thereof. The outlet lines 36 and 53 are conveniently provided with pressure valve control means 54 and 55 by which the pressure of the gas within the respective electrodes may be controlled. It is desirable that the pressure in each electrode be maintained substantially the same, and any suitable system for insuring constant pressure in the composite electrodes 30 and 40 may be employed. Electrical leads 56 and 57 are attached to fuel electrode 30 and antifuel electrode 40 respectively, and the outer ends thereof adapted to be connected to an external circiut, not shown.

As indicated above, the entire spirally rolled assembly is conveniently immersed in an aqueous ion-transfer medium which may be composed of a single aquous ion-containing and conducting medium 58, such as aqueous 6 normal potassium hydroxide. Any other suitable ion-containing and conducting medium may be used. The medium may be conveniently introduced into the chamber defined by housing 47 through either the vent 59 or by forcing the liquid up through the valve conduit 60. Since it may be desirable to regulate the temperature of the ion-containing and conducting medium 58, circulating means 61 including a heat exchanger 62 may be provided as shown in FIG. 5. The temperature controlling medium is introduced to the heat exchanger such as through inlet 63 and exhausted through outlet 64, in a manner which is well understood by those skilled in the art.

Thus, there has been provided in accordance with this invention improvements in structure and assembly of operative components of an electrochemical reaction apparatus such as a fuel cell which enhance the operation of the cell without increasing its size. The improved structure and assembly of the electrode surfaces can readily be adapted to various types of fuels and antifuels respectively and thereby provide a measure of control over the operation of the cell.

Other modes of applying the principle of this invention may be employed instead of those specifically set forth above, changes being made as regards the details herein disclosed provided the elements set forth in any of the following claims, or the equivalent of such be employed.

It is, therefore, particularly pointed out and distinctly claimed as the invention:

1. An electrochemical reaction apparatus comprising in combination:
    (a) a housing forming an enclosed hollow chamber adapted to contain an ion-containing and conducting medium;
    (b) a hollow elongated flexible metallic antifuel electrode having opposed walls and adapted to be disposed in said housing, said antifuel electrode being permeable to an antifuel electrochemical reactant material;
    (c) a hollow elongated flexible metallic fuel electrode disposed in said housing, having opposed walls and adapted to be disposed in said housing said fuel electrode being permeable to a fuel electrochemical reactant material;
    (d) tubular means connected to each end of each of said hollow electrodes and communicating with the interior thereof for separately introducing a gas including a corresponding fuel or antifuel electrochemical reactant material in one tubular means, and exhausting electrochemical reactant-depleted fuel or antifuel, respectively, from the interior of each of said electrodes through the other tubular means;
    (e) means for maintaining the opposing walls of each of said hollow flexible electrodes in spaced relation;
    (f) separate electrode spacing means for maintaining said hollow electrodes in spaced relation to each other;
    (g) said hollow electrodes and said electrode spacing means being disposed in laminar sandwiched spiral-form relation in said enclosed hollow chamber with said tubular means at each of the extremities of said hollow electrodes protruding therefrom; and
    (h) means for exhausting the reaction products from said electrochemical reaction apparatus.

2. An electrode in accordance with claim 1 wherein the electrode walls are thin sheets of palladium.

3. An electrode in accordance with claim 1 wherein the electrode walls are porous nickel.

4. An electrode in accordance with claim 1 in which the spacer means is a fiber glass woven mat.

References Cited by the Examiner

UNITED STATES PATENTS

| | | | |
|---|---|---|---|
| 409,366 | 8/1889 | Mond | 136—86 |
| 651,247 | 6/1900 | Hess | 136—86 |
| 913,390 | 2/1909 | Jungner | 136—86 |
| 1,359,881 | 11/1920 | Emanuel | 136—86 |
| 2,384,463 | 9/1945 | Gunn et al. | 136—86 |
| 2,663,749 | 12/1953 | Warner et al. | 136—90 X |
| 2,786,088 | 3/1957 | Robinson | 136—153 |
| 2,830,109 | 4/1958 | Justi et al. | 136—86 |
| 2,901,523 | 8/1959 | Justi et al. | 136—86 |
| 2,925,454 | 2/1960 | Justi et al. | 136—86 |
| 2,925,455 | 2/1960 | Eidensohn et al. | 136—86 |
| 2,969,315 | 1/1961 | Bacon | 136—86 |
| 2,980,745 | 4/1961 | Peters | 136—120 X |
| 3,125,468 | 3/1964 | Thompson et al. | 136—86 |

FOREIGN PATENTS 350,100    8/1905    France.

OTHER REFERENCES

Electronic Design, October 1, 1957, page 5.

WINSTON A. DOUGLAS, *Primary Examiner.*

JOHN R. SPECK, *Examiner.*

H. A. FEELEY, A. B. CURTIS, *Assistant Examiners.*